(12) United States Patent
Jasperse et al.

(10) Patent No.: US 11,369,964 B2
(45) Date of Patent: Jun. 28, 2022

(54) SAMPLE ANALYZER SYSTEM WITH A SAMPLE VESSEL HAVING OPAQUE AND TRANSLUCENT PORTIONS

(71) Applicant: Siemens Healthcare Diagnostics Inc., Tarrytown, NY (US)

(72) Inventors: Jeffrey Jasperse, Newton, MA (US); Normand Desmarais, Cumberland, RI (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 659 days.

(21) Appl. No.: 16/317,940

(22) PCT Filed: Jul. 17, 2017

(86) PCT No.: PCT/US2017/042370
§ 371 (c)(1),
(2) Date: Jan. 15, 2019

(87) PCT Pub. No.: WO2018/017472
PCT Pub. Date: Jan. 25, 2018

(65) Prior Publication Data
US 2021/0283594 A1     Sep. 16, 2021

Related U.S. Application Data

(60) Provisional application No. 62/363,556, filed on Jul. 18, 2016.

(51) Int. Cl.
*B01L 3/00* (2006.01)

(52) U.S. Cl.
CPC .......... *B01L 3/508* (2013.01); *B01L 2200/12* (2013.01); *B01L 2300/0848* (2013.01); *B01L 2300/12* (2013.01); *B01L 2300/168* (2013.01)

(58) Field of Classification Search
CPC ............... B01L 3/508; B01L 2200/12; B01L 2300/0848; B01L 2300/12;
(Continued)

(56) References Cited

U.S. PATENT DOCUMENTS

| 4,812,294 A | 3/1989 | Combs |
| 5,340,716 A | 8/1994 | Ullman et al. |

(Continued)

FOREIGN PATENT DOCUMENTS

| JP | S5741148 U | 3/1982 |
| JP | 2000180352 A | 6/2000 |

(Continued)

OTHER PUBLICATIONS

International Search Report and Written Opinion of International Application No. PCT/US2017/042370 dated Oct. 4, 2017.

(Continued)

*Primary Examiner* — Jennifer Wecker
*Assistant Examiner* — Oyeleye Alexander Alabi

(57) ABSTRACT

An embodiment of the present disclosure is a sample vessel for a holding a sample for analysis by a sample analyzer. The sample vessel includes a body that includes a bottom, an open top spaced from the bottom along a first axis, a side wall that extends from the open top to the bottom, and an interior chamber for holding a sample and that extends from the open top toward the bottom along the first axis. The body includes an opaque portion, a first translucent portion, and a second translucent portion spaced from the first translucent portion a distance that extends along a second axis that is perpendicular to the first axis. The first and second translucent portions are each disposed along the bottom of the body.

21 Claims, 11 Drawing Sheets

(58) Field of Classification Search
CPC ....... B01L 2300/168; B01L 2300/0654; B01L 2300/0858; B01L 3/5082; G01N 2035/00356; G01N 21/0303; G01N 21/78; G01N 2021/0325; G01N 2021/0382; G01N 2021/6482; G01N 2201/0642; G01N 21/03; B29C 45/16

See application file for complete search history.

(56) References Cited

U.S. PATENT DOCUMENTS

| | | | |
|---|---|---|---|
| 5,693,944 A * | 12/1997 | Rich | G01N 21/0303 250/343 |
| 5,709,994 A | 1/1998 | Pease et al. | |
| 5,807,675 A | 9/1998 | Davalian et al. | |
| 6,249,345 B1 | 6/2001 | Kraack et al. | |
| 2005/0013746 A1 * | 1/2005 | Lee | B01L 3/5082 422/547 |
| 2007/0059219 A1 | 3/2007 | Turner | |
| 2008/0123091 A1 * | 5/2008 | Yamamoto | G01N 21/0303 356/244 |
| 2010/0150779 A1 | 6/2010 | Chow et al. | |
| 2010/0182597 A1 | 7/2010 | Sahiri et al. | |
| 2012/0156796 A1 | 6/2012 | Drechsler et al. | |
| 2013/0287651 A1 * | 10/2013 | Talmer | G01N 21/03 422/554 |
| 2014/0209841 A1 | 7/2014 | Taunk | |
| 2014/0328735 A1 | 11/2014 | Tinner et al. | |

FOREIGN PATENT DOCUMENTS

| | | |
|---|---|---|
| WO | 0075632 A1 | 12/2000 |
| WO | 2007126389 A1 | 11/2007 |

OTHER PUBLICATIONS

European Supplementary Partial Search Report and Written Opinion of European Application No. 17831628.7 dated Jun. 12, 2019.

* cited by examiner

SAMPLE ANALYZER SYSTEM WITH A SAMPLE VESSEL HAVING OPAQUE AND TRANSLUCENT PORTIONS

CROSS-REFERENCE TO RELATED APPLICATIONS

The present application claims priority to and the benefit of U.S. Provisional Application No. 62/363,556, filed Jul. 18, 2016, the entire disclosure of which is incorporated by reference into the present application.

TECHNICAL FIELD

The present disclosure relates to a sample analyzer system, and in particular to a sample vessel with opaque and translucent portions.

BACKGROUND

Various types of tests related to patient diagnosis and therapy can be performed by analysis of a sample, such as a patient's bodily fluids. These tests typically use automated sample analyzers onto which vials containing samples have been loaded. The sample analyzer extracts the samples from the vials and combines the samples with various reagents in reaction cuvettes. Frequently, the samples are incubated or otherwise processed before being analyzed. Such sample analyzers obtain measurements from the sample in order to determine the presence and/or amount of analyte of interest. Although various known clinical analyzers for chemical, immunochemical and biological testing of samples are available, analytical clinical technology is challenged by increasing needs for improved levels of analysis. The improvement of analytical sensitivity continues to be a challenge.

Typical sample analyzers use an optical system and a reaction cuvette during the test procedure to obtain readings from the sample. A typical optical system has an aligned light source and a detector (e.g. spectrophotometer). The reaction cuvette contains the sample and a reagent and is positioned between the light source and detector along an optical axis centerline of the light source. Cuvettes are designed with an input region adjacent to the light source, an output region adjacent to the detector, and optical measurement zone (OMZ) located between the input and output regions. The light source emits light into the input region into the sample-reagent combination inside the cuvette. A chemical reaction of the sample-reagent combination produces chromophores absorbing light at specific wavelengths proportional to the concentration of the analyte being measured.

Light emitted from the illuminated sample-reagent combination inside the cuvette exits the output region and is detected by the detector. The detector obtains an absorbance measurement of the emitted light signal at specific wavelengths following the Beer-Lambert law. In addition to absorbance readings, other readings may be obtained, such as turbidimetric, fluorometric and like readings. The obtained readings are used to determine an amount of analyte in the sample using well-known calibration techniques.

A conventional cuvette is translucent to allow light to pass through the cuvette wall. Quartz and glass cuvettes are commonly used for laboratory analyzers. In healthcare diagnostic analyzers, which are more sensitive to consumable part cost, the cuvettes are made from low cost polymers such as acrylic and/or cyclic olefin copolymer (COC).

SUMMARY

An embodiment of the present disclosure is a sample vessel for a holding a sample for analysis by a sample analyzer. The sample vessel includes a body that includes a bottom, an open top spaced from the bottom along a first axis, a side wall that extends from the open top to the bottom, and an interior chamber for holding a sample and that extends from the open top toward the bottom along the first axis. The body includes an opaque portion, a first translucent portion, and a second translucent portion spaced from the first translucent portion a distance that extends along a second axis that is perpendicular to the first axis. The first and second translucent portions are each disposed along the bottom of the body.

BRIEF DESCRIPTION OF THE DRAWINGS

The foregoing summary, as well as the following detailed description of the illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF THE ILLUSTRATIVE EMBODIMENTS

Figure 1:
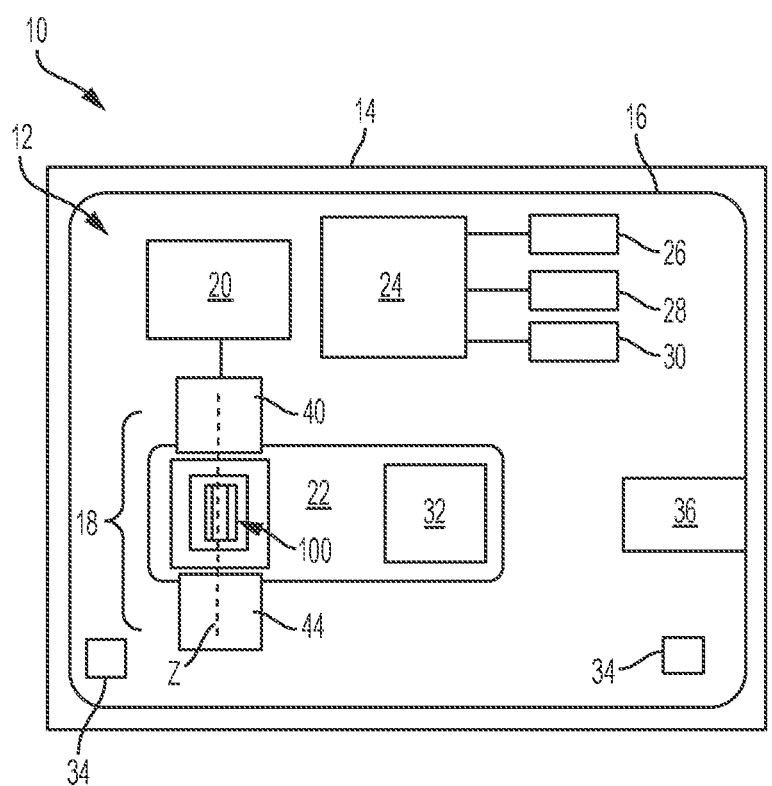
FIG. 1 is a schematic plan view of a sample analyzer system including a sample vessel according to an embodiment of the present disclosure.
Figure 2:
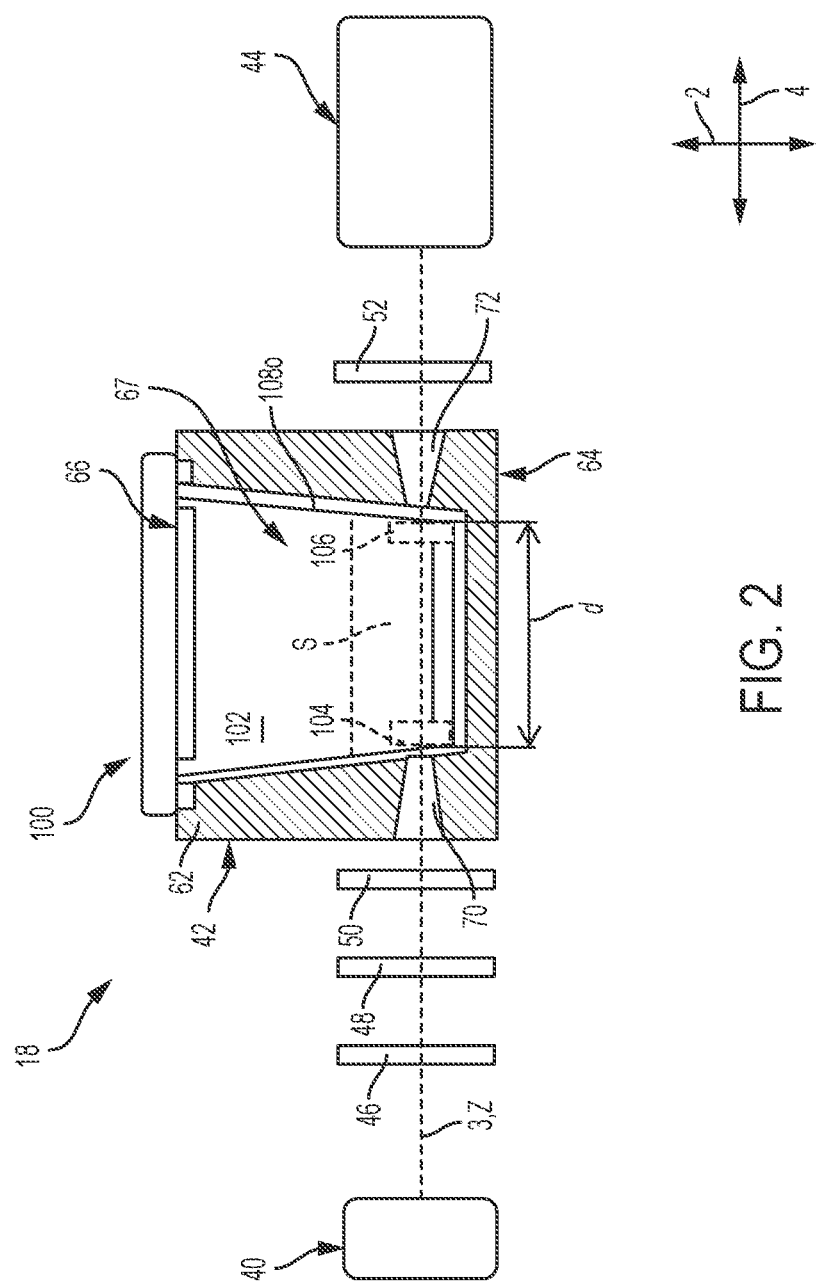
FIG. 2 is a detailed side schematic view of a detection unit in the sample analyzer system illustrated in FIG. 1.

Referring to FIGS. 1 and 2, embodiments of the present disclosure include a sample analysis system 10 adapted to analyze a sample S. The sample analysis system 10 includes a sample analyzer 12 and a sample vessel 100, such as a cuvette. The sample vessel 100 is designed to hold a sample S for analysis by the sample analyzer 12 as will be detailed further below. The sample S can be any type of liquid. For example, the sample S can be a biological sample or body fluid, such as blood, plasma, urine, or other fluids obtained from a patient. Furthermore, the sample S may also include non-biological sample liquids. The sample S is not limited strictly to liquids obtained from the patient.

The sample analyzer 12 includes a housing 14 and a mechanical stage 16 in the housing 14 that supports various components of the sample analyzer 12. The sample analyzer 12 includes a detection unit 18 that holds the sample vessel 100 and can analyze the sample S in the sample vessel 100, and a controller 20 that controls operation of the detection unit 18. A thermal plate 22 may be used to support the detection unit 18 and to incubate the sample S in the sample vessel 100. Additional heating elements (not shown) may be placed proximate the sides of the sample vessel 100 to heat the sample S as needed. A sample dispensing device 24 may be included to dispense a sample from a sample vial, and/or reagent, into the sample vessel 100. The dispensing device 24 includes a motor 26 that powers the dispensing device 24, a pump 28, and a valve 30, such as a lee valve. In certain embodiments, such as for sample analyzers adapted to analyze blood and/or plasma samples, a plasma separator 32 may be included to separate plasma from the blood sample for analysis. The sample analyzer 12 may further include one or more position sensors 34 used to determine the position of the stage 16 and/or detection unit with respect to the sample dispense device 24. A vacuum port 36 may be included to control pressure in the housing 14.

The sample analyzer 12 illustrated in FIG. 1 is an exemplary sample analyzer that illustrates inventive concepts set forth in present disclosure. The sample analyzer 12 as described herein can be any type of sample analyzer adapted to make measurements of the sample S illuminated in cuvette-type sample vessels. In one embodiment, the sample analyzer can be adapted determine an analyte in a highly sensitive assay format known as a Luminescent Oxygen Channeled Immunoassay (LOCI), such as the analyzers disclosed in U.S. Pat. Nos. 5,340,716 and 5,709,994, incorporated herein by reference. In another example, the sample analyzer is adapted to determining an analyte in a less sensitive assay format known as a Fluorescent Oxygen Channeled Immunoassay (FOCI) using a photosensitizer, such as the analyzer disclosed in U.S. Pat. No. 5,807,675, incorporated herein by reference. It should also be appreciated that the sample analyzer can be adapted to analyze multiple samples. In one example, the sample analyzer may include a cartridge adapted to hold a plurality of sample vessels 100. In yet another example, the sample analyzer may be an automated analyzer that includes a moveable carousel for holding multiple sample vessels. Such an analyzer may include multiple detection units testing for different analytes of interest. An exemplary automated analyzer is disclosed in U.S. Patent App. Pub. No. 2010/0150779, incorporated herein by reference. Other exemplary sample analyzers include the ADVIA® and DIMENSION® analyzers marketed by Siemens Healthcare Diagnostics Inc.

Referring to FIGS. 1 and 2, the detection unit 18 includes an illuminator 40 that emits a light along an optical axis Z, a support 42 adjacent to the illuminator 40 and aligned with the optical axis Z, and a detector 44 adjacent to the support 42 along the optical axis Z. The support 42 holds the sample vessel 100 in position along the optical axis Z. As shown in FIG. 2, the detection unit 18 includes a lens 46 adjacent the illuminator 40, a filter 48 and a polarizer 50. On the opposite side of the support 42 is an optional linear polarizer 52. The illuminator 40 emits the light into the sample S and the detector 44 detects the luminescence of the sample S that exits sample vessel 100 as further described below. In accordance with the illustrated embodiment, the illuminator 40 is a LED. However, other light sources could be used. The illuminator 40 is adapted to emit a light of specified wavelength into the sample S contained in the sample vessel 100. The detector 44 may be a spectrophotometer as is known in the art.

Referring to FIG. 2, the support 42 is designed to hold the sample vessel 100 along the optical axis Z. In FIG. 2, the support 42 is shown in cross-section and the sample vessel 100 is shown as a side view partially inside the support 42. The support 42 includes a body 62 that defines a base 64, an open top 66, and a cavity 67 extends into body 62 from the open top 66 toward the base 64. The cavity 67 is sized to receive the sample vessel 100. As shown the shape of the cavity 67 corresponds generally to the outer surface 108o of the sample vessel 100. The support 42 also includes first aperture 70 (or input aperture) that opens to the cavity 67, and a second aperture 72 (or output aperture) opposite the first aperture 70 and that is open to the cavity 67. The first aperture 70 and the second aperture 72 are aligned along the optical axis Z such that light emitted from the illuminator 40 can pass through the first aperture 70 into the sample vessel 100.

Embodiments of the present disclosure include sample vessels that address drawbacks in conventional sample vessels, or cuvettes. In conventional sample vessels, light scatter and reflectance, whether caused by the cuvette or other structures proximate the cuvette, impart noise into the light signal detected by the detector, affecting measurement accuracy. In some instances, the translucent polymers used for typical cuvettes can cause unwanted light scattering and reflections through the sample vessel sidewall. Typical translucent cuvettes also have optically reactive interior surfaces, which results in increased light scatter and reflections inside the cuvette. For polymeric cuvettes, very tight tolerances are typically required to maintain the desired optical path length between the input and output regions of the cuvette to keep measurement error low. Manufacture outside these tolerances could lead to inaccurate readings. Sample analyzers also have structures near the cuvette, such as heating plates or other heating elements as described above, which can also cause unwanted light scatter and reflections, affecting measurement accuracy. The meniscus at the top of the sample S can also cause unwanted reflections back into the signal path. Longer optical path lengths through the sample S inside the cuvette can cause unwanted scatter and reflections in its surroundings, thus more error, compared to a shorter optical path length. Furthermore, conventional cuvettes are prone to electrostatic build-up causing dry reagent beads to suspend above the cuvette bottom adversely affecting rehydration. Inadequate reagent rehydration, in turn, may adversely affect absorbance readings. Electrostatic build-up combined with light scatter problems described above exacerbates measurement error.

Many of the problems described above have typically been addressed by increasing the size of cuvette. The objective has been to construct the cuvette with a sufficiently large volume in the optical measurement zone, pushing the interfering cuvette walls away from the optical centerline axis Z. This in turn increases both the size of the cuvette and the sample volume necessary to fill the optical measurement zone adequately. Another approach used is to reduce the input and output light signals by means of very small input and output aperture holes in the support, which create small input and output beams. From the perspective of reducing unwanted scatter and reflection interference, an ideal cuvette has very large input and output regions adjacent to very small input and output beams. Cuvettes with large input and output regions are at odds with the desire to keep the total sample volume small so as to use less reagents and sample fluid.

Figure 3:
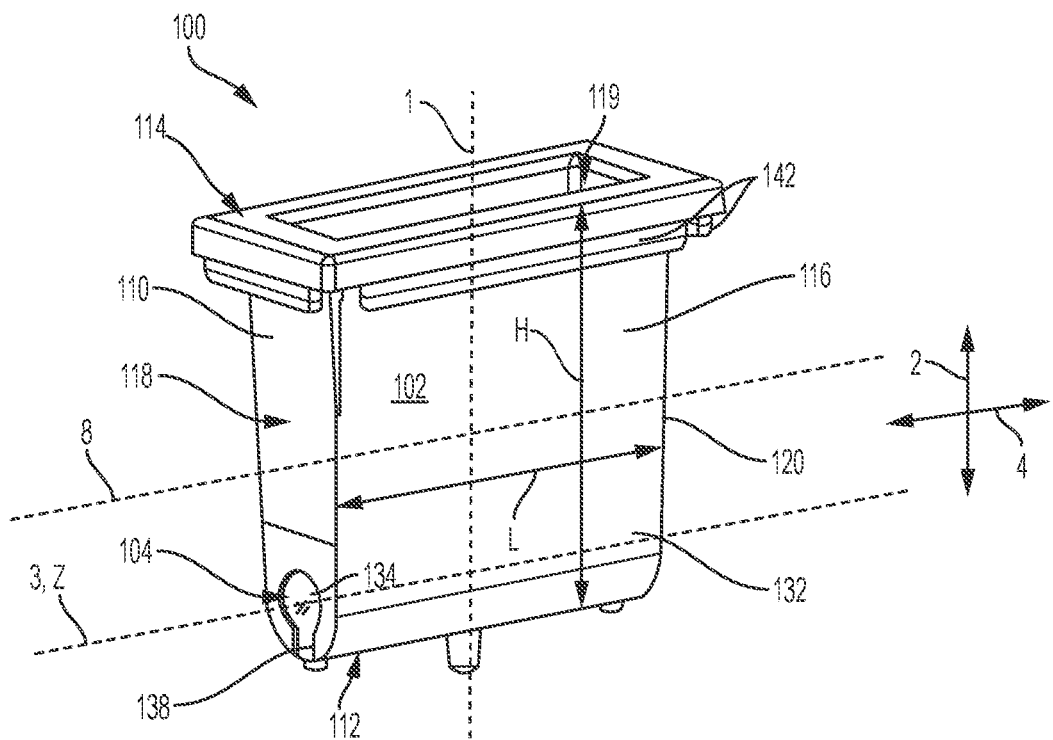
FIG. 3 is a top perspective view of the sample vessel illustrated in FIG. 1.
Figure 4:
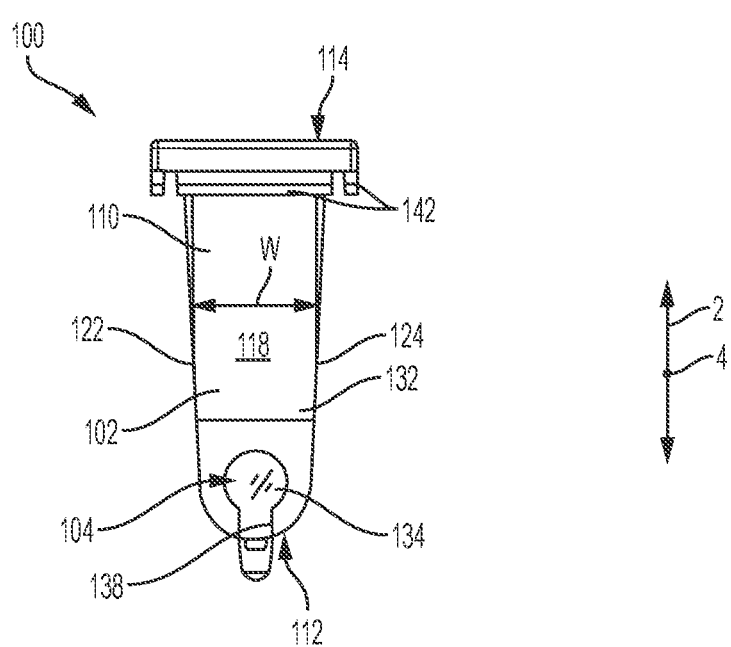
FIG. 4 is an end view of the sample vessel illustrated in FIG. 1.
Figure 5:
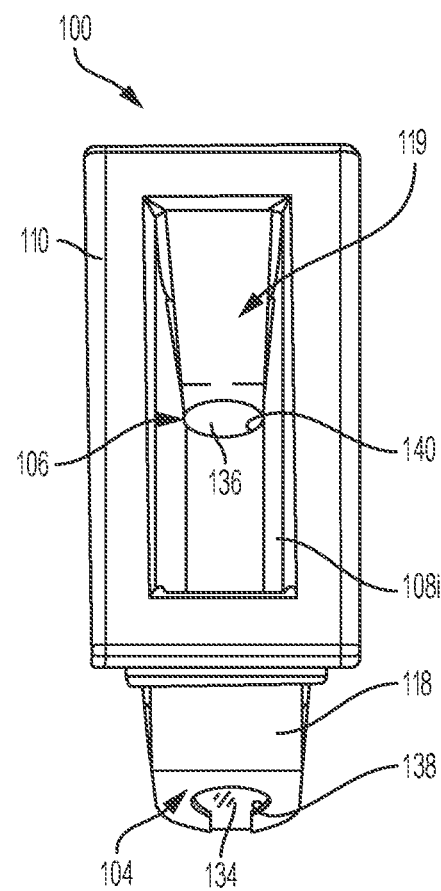
FIG. 5 is a top perspective view of the sample vessel illustrating the internal chamber of the sample vessel shown in FIGS. 2-4.

Embodiments of the present disclosure include sample vessels that address the above described drawbacks by utilizing sample vessels that are substantially opaque and also have aligned first and second translucent portions through which light can pass. Continuing with FIGS. 2 and 3, the sample vessel 100 holds the sample and reagent combination as explained above. As illustrated, the sample vessel 100 includes an opaque portion 102, a first translucent portion 104, and a second translucent portion 106 opposite the first translucent portion 104. The sample vessel 100 also provides a means to use electrostatically dissipative materials without affecting the optical quality of the sample vessel 100. The sample vessel 100 and related manufacturing process reduces unwanted scatter and reflections and optionally dissipation of electrostatic charge while maintaining a relative low unit cost for each sample vessel 100.

Figure 11A:
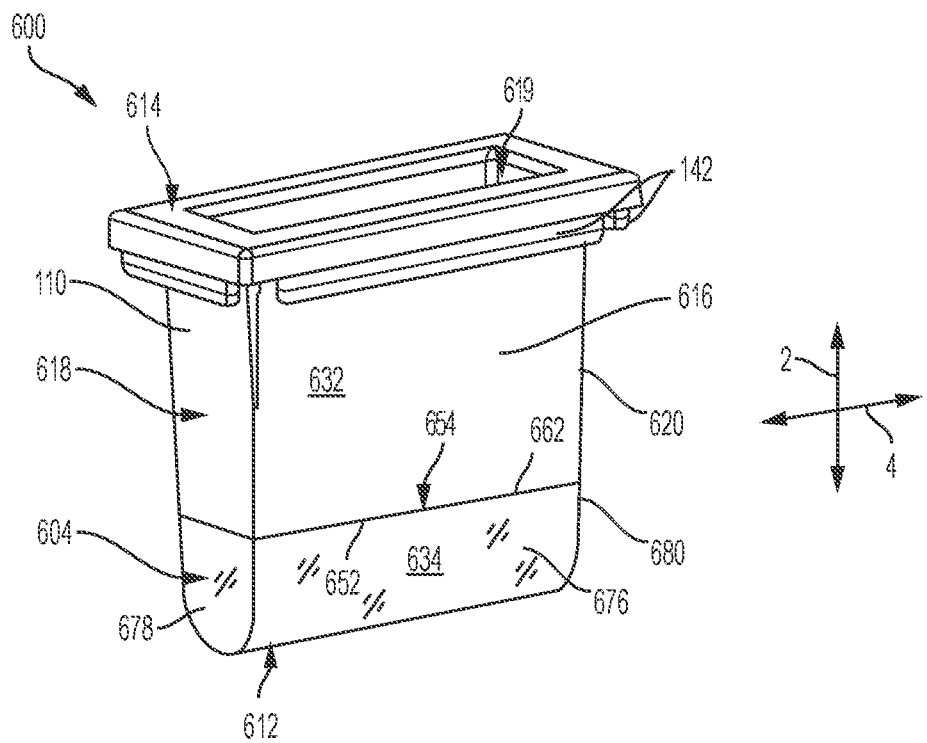
FIG. 11A is a top perspective view of a sample vessel according to another embodiment of the present disclosure.
Figure 11B:
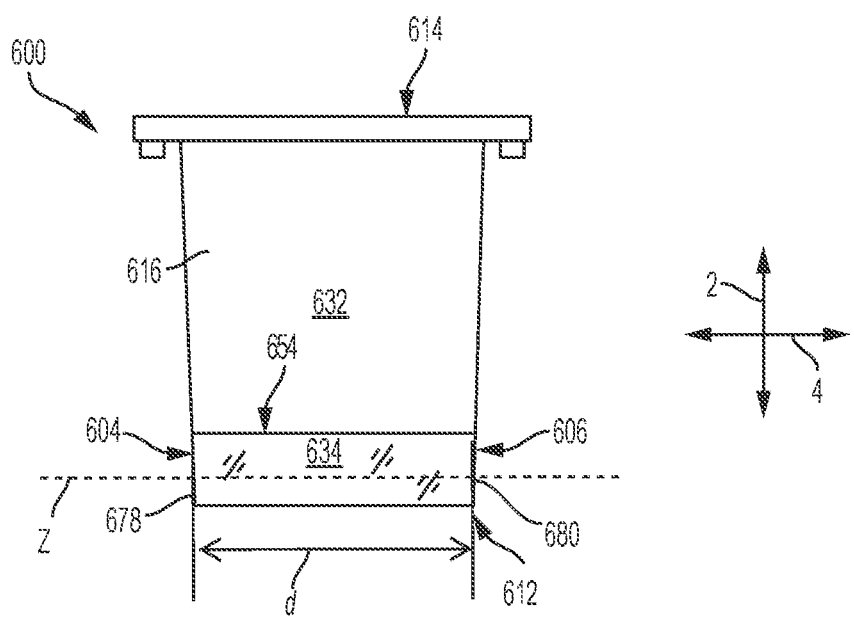
FIG. 11B is a side view of the sample vessel shown in FIG. 11A.

As used herein, the opaque portion 102 refers to the region of the sample vessel 100 that does not pass light emitted from the illuminator 40 therethrough. The first and second translucent portions 104 and 106, in contrast, are regions of the sample vessel 100 that permit light to pass therethrough. As shown, the first and second translucent portions 104 and 106 define an optical path along the optical axis Z through an otherwise opaque sample vessel 100. The opaque portion 102 and translucent portions 104,106 can be different component parts of the sample vessel 100 as illustrated and explained further below. In another example, the opaque portion 102 can be defined by an opaque body and the translucent portions 104, 106 can be defined by surface areas on opposed ends of a translucent body that is coupled the opaque body, as shown in FIGS. 11A and 11B. Alternatively or additionally, the opaque portion 102 and translucent portions 104,106 can be different regions of the surface of the sample vessel 100. In another example, the opaque portion 102 can be defined by an opaque coating applied the surface of translucent sample vessel 100 and the translucent portions 104, 106 can be defined by surface areas that do not have any such opaque coating.

The sample vessel 100 as described herein includes a predominate amount of the opaque portion 104 relative to the first and second translucent portions 104 and 106. The opaque portion 102 can comprise at least 50% of the material used to construct the sample vessel 100. It should be appreciated that "at least 50%" (or other ranges noted below) in this context includes some percentage less than an entirety, i.e. 100%, of the material used to construct the sample vessel 100. For instance, a defined amount of the sample vessel 100 comprises the translucent portions 104 and 106 described further below. In one example, the opaque portion 102 comprises at least 50% of the material used to construct the sample vessel 100. In another example, the opaque portion 102 can comprise at least 60% of the material used to construct the sample vessel 100. In yet another example, the opaque portion 102 can comprise at least 70% of the material used to construct the sample vessel 100. In yet another example, the opaque portion 102 can comprise at least 80% of the material used to construct the sample vessel 100. In another example, the opaque portion 102 can comprise at least 90% of the material used to construct the sample vessel 100. In yet another example, the opaque portion 102 can comprise at least 95% of the material used to construct the sample vessel 100.

As noted above, a predominate amount of the sample vessel 100 is comprised of the opaque portion 104. The first and second translucent portions 104 and 106 comprise most, if not all, of the balance of the material used to construct the sample vessel 100. The amount of the translucent portions 104 and 106 used should be sufficient to define the desired optical path. For instance, the amount of the translucent portions 104 and 106 may comprise, for example, at least about 1% up to 50% of the material used to construct the sample vessel 100. Accordingly, in one example, the first and second translucent portions 104 and 106 comprise no greater than 50% of the material used to construct the sample vessel. In another example, the first and second translucent portions 104 and 106 comprise no greater than 40% of the material used to construct the sample vessel 100. In yet another example, the first and second translucent portions 104 and 106 comprise no greater than about 30% of the material used to construct the sample vessel 100. In yet another example, the first and second translucent portions 104 and 106 comprise no greater than 20% of the material used to construct the sample vessel 100. In yet another example, the first and second translucent portions 104 and 106 comprise no greater than 10% of the material used to construct the sample vessel 100. In yet another example, the first and second translucent portions 104 and 106 comprise no greater than 5% of the material used to construct the sample vessel 100.

Figure 6:
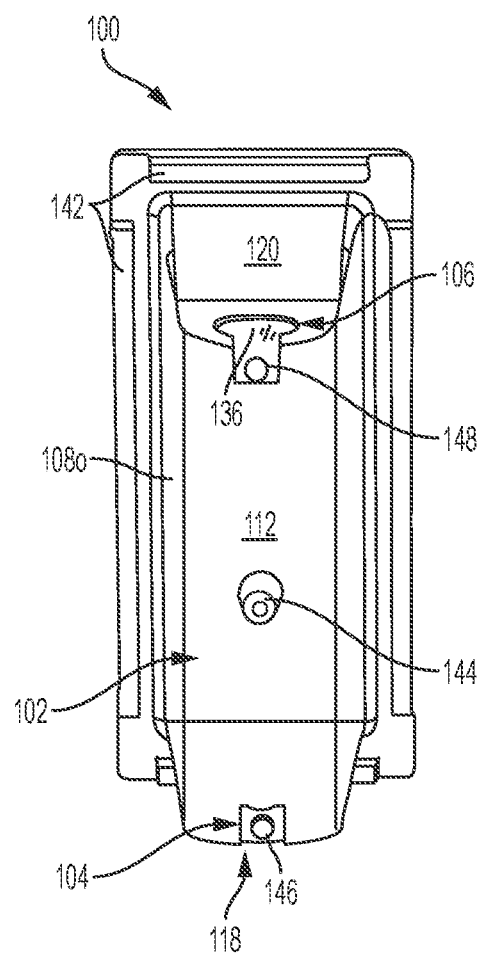
FIG. 6 is a bottom perspective view of the sample vessel shown in FIGS. 2-4.

Referring to FIGS. 3-6, the sample vessel 100 includes a vessel body 110. The vessel body 110 defines a bottom 112, an open top 114 spaced from the bottom 112 along a first axis 1 that is aligned with a first direction 2, a side wall 116 that extends from the open top 114 to the bottom 112, and an interior chamber 119 for holding the sample S. The body includes an inner surface 108*i* that defines the interior chamber 119 and an outer surface 108*o* (FIG. 6). The first direction 2 can be referred to as a vertical direction and the first axis 1 can be a vertical axis. The side wall 116 has a first end 118 that includes the first translucent portion 104, a second end 120 opposite the first end 118 and that includes the second translucent portion 106, a first side 122, and a second side 124 opposite the first side 122. The first end 118 is opposite the second end 120 along a second direction 4 that is perpendicular to the first direction 2. The second direction 4 can be referred to as a horizontal direction.

As illustrated in FIGS. 3-6, the vessel body 110 defines a length L that extends from the first end 118 to the second end 120 along the second direction 4, and a width W that extends from the first side 122 to the second side 124 and that is perpendicular to the length L. The vessel body 110 defines a height H that extends from the bottom 112 to the top 114 along the first direction 2. As shown, the length L is greater than the width W such that the vessel body 110 defines a rectangular cross-sectional shape along a plane that is perpendicular to the vertical direction 2. Furthermore, the sidewall 116 is tapered such that the length L varies along the height H of the sample vessel 100. As shown, the tapered sidewalls 116 can facilitate part ejection during the molding process as further explained below. It should be appreciated that the length L and width W can be substantially the same so as to define a square cross-sectional shape, such as sample vessels 500 and 700 illustrated in FIGS. 10A and 12A, respectively, and described further below. In still other embodiments, the side wall 116 can be substantially curved with respect to first direction 2. For example, the side wall 116 can have a circular cross-sectional shape, such as the vessel 900 shown in FIG. 14.

Continuing with FIGS. 3-6, the first and second translucent portions 104 and 106 are disposed along the bottom 112 of the sample vessel 100 in order to align with optical axis Z of the illuminator 40 when placed in the support 42 (FIG. 2). The first translucent portion 104 and the second translucent portion 106 spaced apart along a second axis 3 that is aligned with the horizontal direction 4. The first axis 1 and the second axes 3 are perpendicular to each other and intersect. When the sample vessel 100 is placed in the support 42, the first and second translucent portions 104 and 106 are aligned along the optical axis Z (FIG. 2) such that the second axis 3 is coaxial with the optical axis Z. In accordance with the illustrated embodiment, the vessel body 110 defines a horizontal central axis 8 that is about equidistant between the top 114 and the bottom 112. The horizontal central axis 8 is shown aligned with the first direction 2 and parallel to but vertically spaced above the optical axis Z/second axis 3. As shown, the first translucent portion 104 and the second translucent portion 106 are positioned entirely below the horizontal central axis 8. In alternative embodiments, however, the first and second translucent portions 104 and 106 may extend to or above the horizontal central axis 8.

Still referring to FIGS. 3-6, the first and second translucent portions 104 and 106 define a path for light to pass through into the sample vessel 100 and the opaque portion 102 inhibits unwanted reflectance and light scatter emanating from the sample vessel 100 into the detector 44. In accordance with the embodiment illustrated in FIGS. 3-6, the opaque portion 102 and the first and second translucent portions 104 and 106 are in contact with the sample S once sample S is deposited in the internal chamber 119 of the sample vessel 100. For example, part of the opaque portion 102 defines the bottom 112 of the sample vessel 100 and would contact the sample S when the sample S is deposited in the sample vessel 100.

Continuing with FIGS. 3-6, the first translucent portion 104 and the second translucent portion 106 are spaced apart a distance d along the optical axis Z. The distance d also can be said to define, in part, a void or portion of the internal chamber 119 in which sample S can be contained. The sample vessels described herein define a precision path length d for light that extends from the first translucent portion 104 to the second translucent portion 106. Under the Beer-Lambert law of attenuation of light in a material can be determined according to the following equation:

$$T(\lambda)=To(\lambda)e^{-c\varepsilon(\lambda)d},$$

where $T(\lambda)$ is the transmitted power, $To(\lambda)$ is the incident before the sample, $\varepsilon(\lambda)$ is the extinction coefficient, and d is the distance or sample path length at a specific wavelength. The absorbance spectrum is equal to the $-\log(T(\lambda)/To(\lambda))$.

In accordance with embodiments of present disclosure, the distance d is centered along the optical axis Z with the input aperture 70 and illuminator 40, and output aperture 72 and detector 44. It should be appreciated that the distance d may be modified based on a number of different factors, including type of sample S being analyzed, sample volume, concentration limits (lower and upper) in the sample, and the optical density (OD) of the side wall of the sample vessel 100.

For example, the distance d can be as low as 0.1 mm for systems that analyze whole blood samples. In other settings, such as for a sample vessel used for a clinical chemistry cuvette vessel the distance can be greater than 0.1 mm, for instance between 5 mm and 20 mm. Furthermore, larger distances d make it easier detect small signals, such as that produced from low concentration HDL chemistry reaction with reagents. In accordance with the illustrated embodiments, the distance d (path length) can range from about 0.1 mm to about 20.0 mm. In one example the distance is between 5.0 mm and 15.0 mm. In another example, the distance d is about 10.0 mm. Distance d may range from about 0.1 mm to about 20.0 mm for each one of the different embodiments of the sample vessel disclosed herein, such as, for example, the sample vessel 100 illustrated in FIGS. 3-6, the sample vessel 500 illustrated in FIGS. 10A-10B, the sample vessel 600 illustrated in FIGS. 11A-11B, the sample vessel 700 illustrated in FIGS. 12A-12B, sample vessel 800 illustrated in FIG. 13, and the sample vessel 900 illustrated in FIG. 14.

Continuing with FIGS. 3-6, the sample vessel 100 is an injection molded part with multiple components that define the opaque portion 102 and translucent portions 104, 106. In accordance with the illustrated embodiment, the vessel body 110 includes an opaque body component 132 that defines the opaque portion 102, a first translucent component 134 that defines the first translucent portion 104 and a second translucent component 136 that defines the second translucent portion 106. As described above, the opaque portion 102 is a region that does not transmit light therethrough. The opaque component 132 is a discrete part of the sample vessel 100 that defines the opaque portion 102. Likewise, the first and second translucent portions 104 and 106 are regions of the sample vessel 100 that permit light to pass therethrough. The translucent components 134 and 136 are discrete parts that define the translucent portions 104 and 136. As shown, the first translucent component 134 and the second translucent component 136 are disposed inside a first keyway 138 and a second keyway 140, respectively, defined by the vessel body 110. The first and second keyways 138 and 140 each have a substantially circular cross-sectional shaped portion (or circular portion) (not numbered) and a linear portion (not numbered) that extends from the circular portion to the bottom 112. The cross-sectional shape of the circular portion of the keyways 138, 140 are perpendicular to the second direction 4. Accordingly, the first translucent portion 104 (or component) and the second translucent portion 106 (or component) each have a substantially cross-sectional shaped portion. Other keyway shapes may be used. The opaque component 132 also includes a gate 144 at the bottom 112 used during manufacturing as further detailed below. Each keyway 138 and 140 is open at the bottom 112 to the respective gates 146 and 148 and is used to help form the translucent components 134 and 136 inside the keyways 138 and 140, respectively.

The opaque component 132 comprises a first polymeric material, and the first and second translucent components 134 and 136 each comprise a second polymeric material that is different from the first polymeric material. The first polymeric material may be pigmented to render the polymeric material substantially opaque. For example, the first polymeric material may be a black polymeric material, such as black acrylonitrile butadiene styrene (ABS). The first polymeric may also include an antistatic agent to reduce electrostatic charge. The antistatic agent can be an additive, such as carbon black, or an antistatic coating applied the sample vessel body. The second polymeric material may be a substantially translucent polymeric material. For example, the second polymeric material may be a cyclic olefin copolymer (COC), COC copolymer, acrylic, acrylic copolymer, polystyrene, polycarbonate, polyetheramide, or other translucent polymeric materials, and/or copolymers thereof. In one example, the second polymeric material is a cyclic olefin copolymer (COC). In another example, the second polymeric material is an allyl diglycol carbonate (ADC). It should be appreciated that the first and second polymeric materials may comprise a wide range of polymer components, additives, lubricants, and/or other additives to aid in manufacturing or to provide additional functional features and/or processing aids. The first and second polymeric materials, however, should be compatible with the chemistry or dried reagents contained in the sample vessel. A person of skill in the art could account for such material selection in view of the specific sample-reagent combination held in the sample vessel. The sample vessel configuration as described herein permits use of high performance and more costly polymers to be used in the small window area while using low cost polymers in the remaining portion of the vessel. In prior art sample vessels, what is conventionally done is the entire vessel is formed using a material to maintain accurate path length, such as, for example, more high performance polymers.

As shown, the sample vessel 100 is an injection molded part that includes an opaque component 132 and two translucent components 134 and 136 that define the optical input and output windows for light. In accordance with an alternative embodiment, however, the vessel body 110 is substantially translucent and the opaque portion 102 is an opaque coating applied to the outer and/or inner surfaces of the vessel body 110. The opaque coating is applied to avoid coating portions of each opposing end of the vessel body 110, thereby defining the first and second translucent portions. The opaque coating may help the optical isolation of any heating elements that are in close proximity to the sample vessel.

Continuing with FIGS. 3-6, the vessel body 110 may also including locking features 142 disposed along the top 114 for engaging the support 42. As illustrated, the locking features 142 can be ridges sized to fit within grooves formed in the top of the support 42. The locking features 142 stabilize the sample vessel 100 in the support 42 and aid in aligning the first and second translucent portions 104 and 106 along the optical axis Z (FIG. 2). The locking features 142 may be adapted for a variety of support structures, including those for cartridge-type analyzers and/or analyzers with a carousel. Alternatively, the sample vessel can be attached to the cartridge holder by means of ultrasonic welding on an automated manufacturing assembly line.

The sample vessels as described herein have several features that facilitate obtaining desirable optics when used in a sample analyzer. For example, the sample vessel 100 has sufficiently thick walls to maintain rigidity and low geometric distortion during the manufacturing process while providing for optically clear first and second translucent portions 104 and 106. For example, the sidewall 116 of the opaque portion 104 should be thick enough to provide higher optical density (OD) when using typical polymeric materials.

Additionally, the sample vessel 100 can be placed in close proximity, or in contact with, the heating elements in the sample analyzer. This, in turn, can optimize incubation and improve heat transfer using a simple heating infrastructure. Certain sample analyzer systems are designed to partially submerge the sample vessel in oil to facilitate incubation. The oil is heated, which in turn, heats the sample vessel. In other sample analyzers, the support is designed to create an air gap that extends around the sample vessel. In such analyzers, heating elements are adapted to heat the air gap and thus incubate the sample reagent combination in the sample vessel. When sample vessels are positioned in these types of sample analyzer systems, the accuracy and repeatability of positioning relative to the surrounding heating structure (e.g. oil or air gap) influences cuvette-to-cuvette measurement variation, and consequently assay measurement error. Embodiments of the present disclosure that include the opaque portion can eliminate this source of error. Heating elements can be placed in direct contact with the sample vessel, providing faster thermal transient response. Furthermore, because the sample vessel described herein can be in direct contact with the heating element, sample vessel packing density side-by-side may be maximized.

Furthermore, in certain embodiments, the use of two different components to form the sample vessel can minimize costs while optimizing performance. As noted above, typical sample vessel are manufactured entirely from relatively expensive translucent polymeric materials or quartz, which are relative expensive. For example, using an opaque polymeric material (e.g. black ABS) to form the opaque component 132 and translucent polymeric material (e.g. COC) to form the first and second translucent components 134 and 136, the amount of translucent polymeric material used in the sample vessel is lower than what might be used to form typical sample vessels described above. Accordingly, embodiments of the present disclosure provide an acceptable balance between costs of the sample analyzer and costs of the sample vessel. The processing method described below also facilitates the formation of a precision path length d from the first translucent portion 104 to the second translucent portion 106.

An illustrative method for manufacturing the sample analyzer system 10 and sample vessel 100 is described next. As illustrated in FIGS. 7-9B, the method 200 includes a sample vessel forming phase 202 and an assembly phase 300. The assembly phase 300 includes assembly of the sample analyzer 12 according to typical manufacturing methods.

Figure 7:
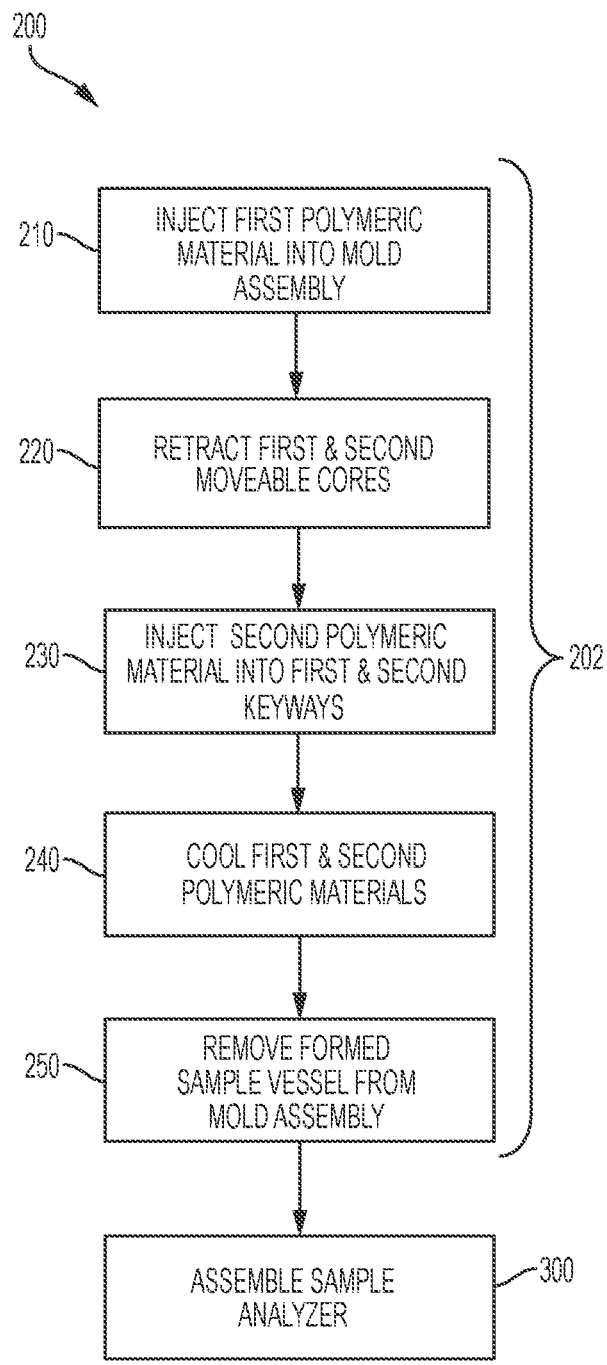
FIG. 7 is a process flow diagram illustrating a method for manufacturing the sample analyzer system and sample vessel illustrated in FIG. 1.
Figure 8:
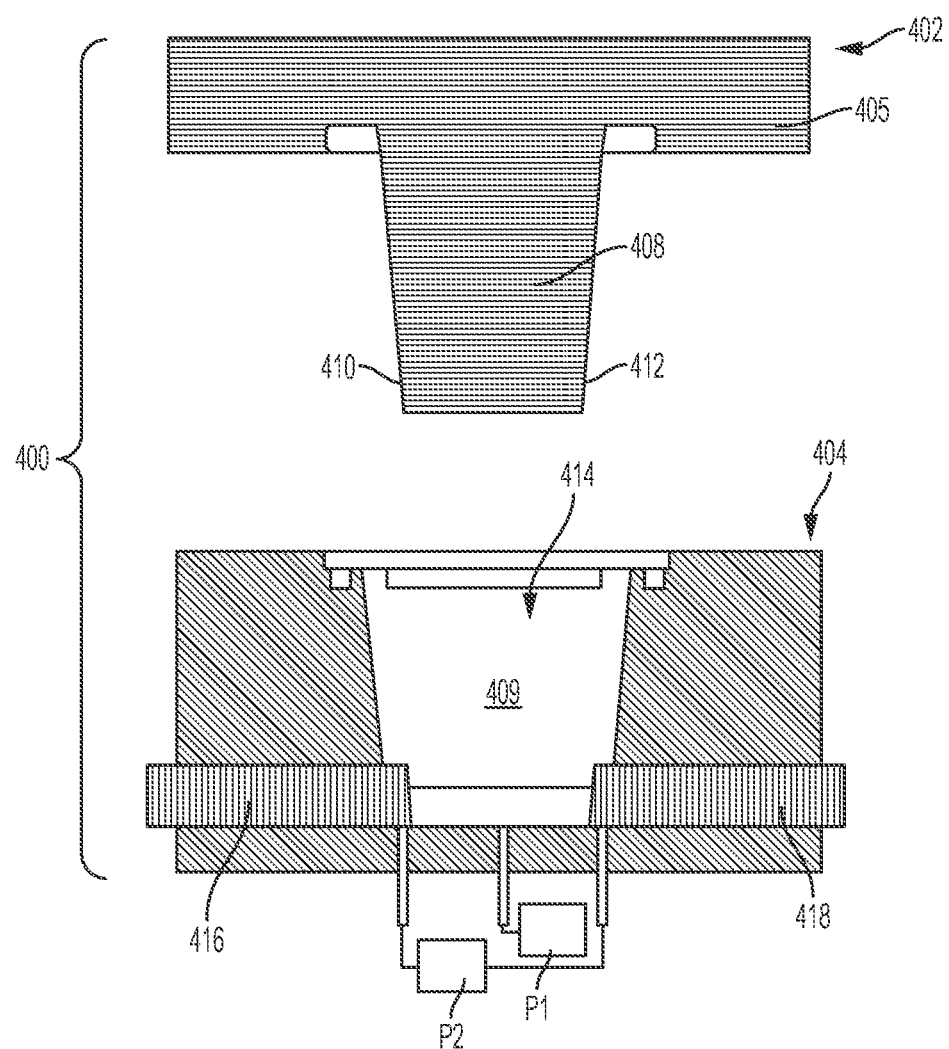
FIG. 8 is a schematic sectional exploded view of a mold assembly used to manufacture the sample vessel according to an embodiment of the present disclosure.
Figure 9A:
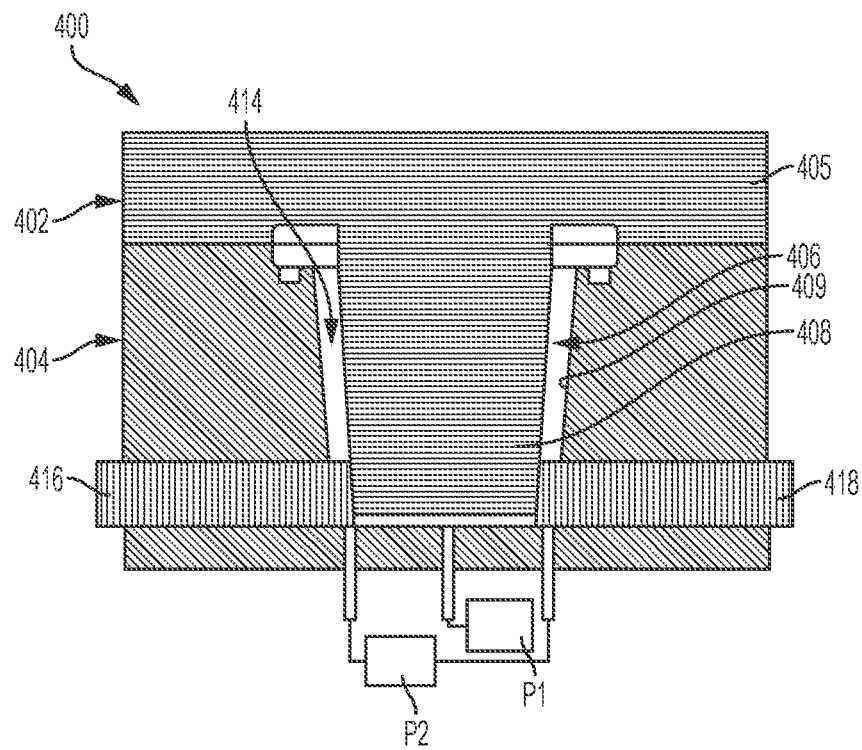
FIGS. 9A and 9B are partial schematic sectional views of the mold assembly illustrated in FIG. 8, showing different phases of manufacturing the sample vessel according to an embodiment of the present disclosure.
Figure 9B:
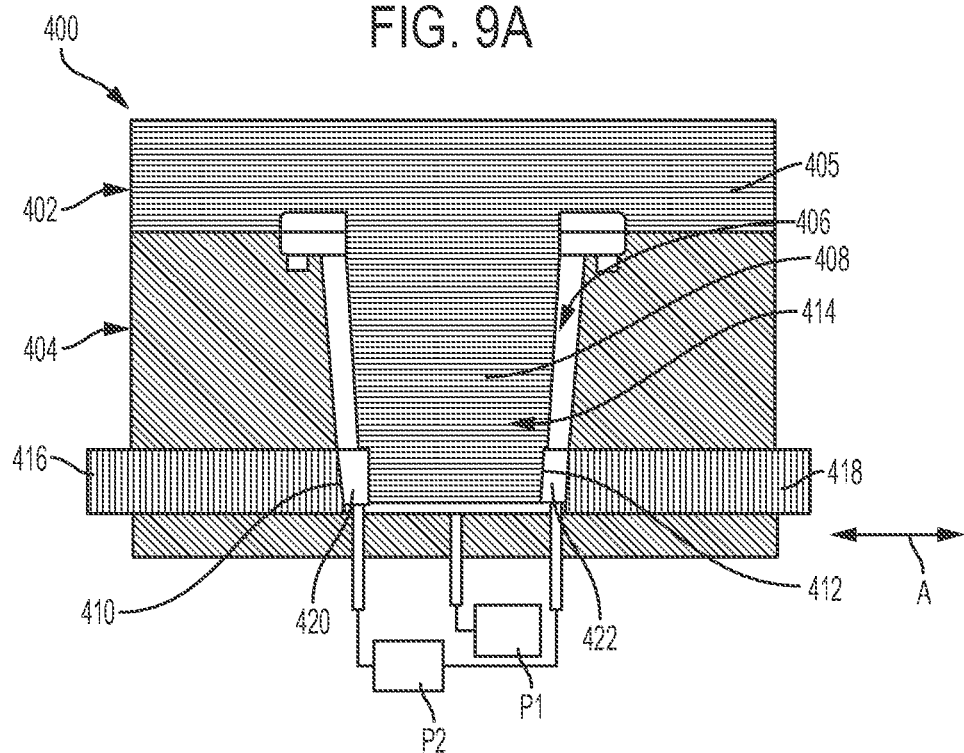

As shown in FIGS. 7-9B, in accordance with the illustrated embodiment, the sample vessel 100 is formed using a two-shot injection molding process. The injection molding process uses injection molding equipment to form a molded part in the shape of the sample vessel 100 as described herein. Turning to FIGS. 8-9B, the injection molding equipment may include one or more polymer sources P1 and P2, a melt unit, a mold assembly 400, and a press for the mold assembly 400. The melt unit and press are not shown in the figures.

Continuing with FIG. 8, the mold assembly 400 is designed for two-shot injection molding process to create a sample vessel 100 having opaque portion 102 and first and second translucent portions 104 and 106. The mold assembly 400 used herein includes a first mold 402, a second mold 404 designed to engage the first mold 402 to define the part cavity 406. The part cavity 406 corresponds to the shape of the vessel body 110. The first mold 402 includes a mold body 405 and a projection 408. The projection 408 defines a first surface 410 and a second surface 412 that are opposite with respect to each other. The mold body 405 and projection 408 define the shape of the top 114 and the inner surface 108i (FIG. 5) of the sample vessel 100. The second mold 404 includes a mold surface 409 that, in turn, defines a cavity 414. The cavity 414 generally corresponds to the shape of the projection 408 of the first mold 402. The mold surface 409 defines the outer surface 108o of the sample vessel 100. It should be understood that the difference between the shape of cavity 414 of the second mold 404 and the shape of the projection 408 of the first mold 402 define the part cavity 406.

Continuing with FIG. 8, the mold assembly 400 also includes a first moveable core 416 and a second moveable core 418 that are in contact with the first and second surfaces 410 and 412 of the first mold 402 during an initial phase of molding. The first and second moveable cores 416 and 418 are moveable with respect to the first and second molds 402 and 404 along a direction A in order to facilitate forming the sample vessel 100 as further explained below. The mold assembly 400 includes additional channels (not numbered) through which polymeric material flows from first and second polymer sources P1 and/or P2. The channels define gates 144, 146, and 148 (shown in FIG. 6) that facilitate manufacturing.

Referring to FIGS. 7 and 8, the method 200 includes injecting 210 a first polymeric material through a gate 144 into the part cavity 406 of the mold assembly 400. A first polymer source P1 supplies the first polymeric material. Because the first core 416 and the second core 418 are in contact with the first mold 402, injection of the first polymeric material into cavity 406 facilitates forming the first and second keyways 138 and 140. As is known, the melt unit (not shown) heats the first polymeric material to facilitate flow through the channel into the part cavity.

After the first polymeric material is injected into part cavity 406 and while the first polymeric material is still hot, the first and second cores 416 and 418 are retracted 220 from contact with the first and second surfaces 410 and 412 of the first mold 402, respectively. As shown, the first and second moveable cores 416 and 418 are retraced along a direction A. The moveable cores 416 and 418 can move in directions other than what is shown as needed. Retraction of the first core 416 and the second core 418 creates a first void 420 and a second void 422 in the part cavity 406, respectively. As illustrated, the first and second voids 420 and 422 are defined by a) the first and second cores 416 and 418, b) the first and second surfaces 410 and 412 of the first mold, respectively, and c) the inner surface (not numbered) of the second mold 404. The first and second voids 420 and 422 formed in the mold assembly define the first and second keyways 138 and 140 formed in the opaque component 102 of the sample vessel 100.

Next, a second polymeric material, supplied from the second polymeric source P2, is injected 230 through first and second gates 146 and 148 into the first and second keyways 138 and 140, respectively. As is known, another melt unit (not shown) heats the second polymeric material to facilitate flow through the channel into the keyways 138 and 140. The second polymeric material is a translucent polymer, and defines the first and second translucent components 134 and 136 disposed within the keyways 138 and 140 of the vessel body 110 in the final part configuration. The first and second polymeric materials are cooled 240 in the part cavity 406 to solidify a sample vessel body 110. The method 200 includes removing 250 the sample vessel body 110 from the mold assembly 400. Additional processing steps (not shown) may be required to trim the final part.

As illustrated, the vessel forming phase 202 is an injection molding process. It should be appreciated, however, that methods other than injection molding may be used to form the sample vessel 100 as described herein. For example, the sample vessel 100 can be formed via thermoforming, blow molding, vacuuming forming, and the like. Furthermore, the sample vessel 100 can be manufactured using a forming technique to form the sample vessel body 110 and a coating process to define the translucent portions 104 and 106.

The method 200 continues with the assembly 300 of the sample analyzer 12, including the assembly of the components of the sample analyzer 12 as described herein.

FIGS. 10A-14 illustrate alternative embodiments of a sample vessel formed in accordance with inventive concepts disclosed herein.

Figure 10A:
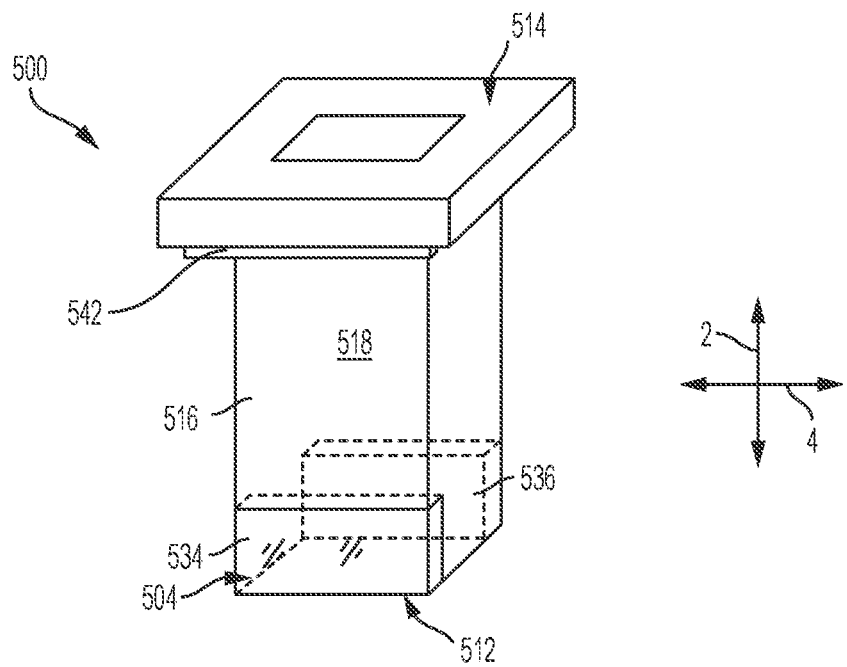
FIG. 10A is a top perspective view of a sample vessel according to another embodiment of the present disclosure.
Figure 10B:
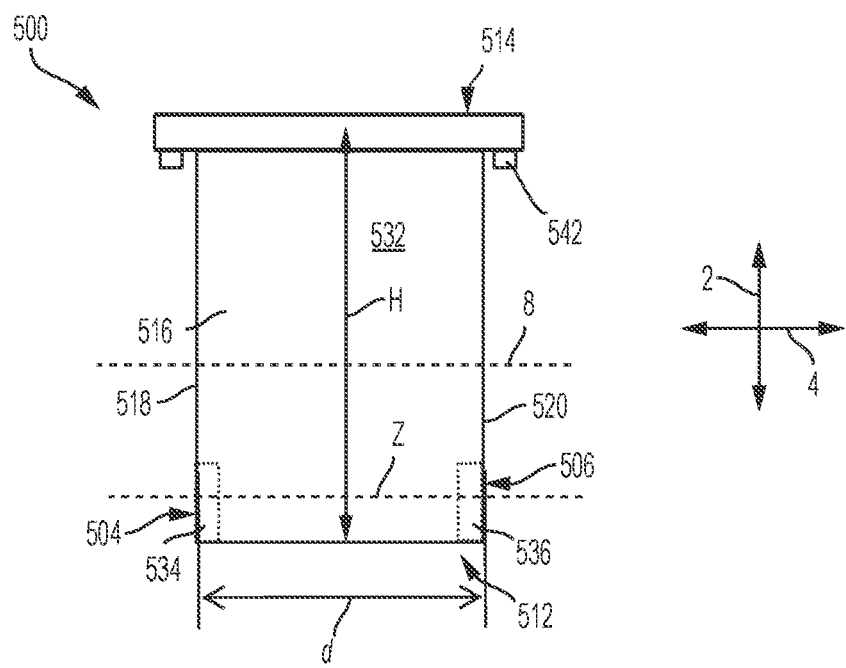
FIG. 10B is a side view of the sample vessel shown in FIG. 10A.

As illustrated in FIGS. 10A and 10B, a sample vessel 500 having a rectilinear shape with non-tapered sidewalls is shown. Similar reference numbers will be used for features that are common to the sample vessel 100 illustrated in FIGS. 1-6 and the sample vessel 500 illustrated in FIGS. 10A-10B. As illustrated, the sample vessel 500 includes a bottom 512, an open top 514, a first end 518, a second end 520 opposite the first end 518 along a horizontal direction 4, and a side wall 516 that extends from the open top 514 to the bottom 512 along a vertical direction 2. The sample vessel 500 also includes a locking feature 542 located on the open top 514 that engages a support (not shown). The sample vessel 500 includes an opaque component 532, a first translucent component 534 and a second translucent component 536 spaced from the first translucent component 534 along the horizontal direction 4 (or optical axis Z). The first translucent component 534 and the second translucent component 536 are disposed on the first end 518 and the second end 520, respectively, so as to be spaced apart with respect to each other along the optical axis Z. In the illustrated embodiment, first and second translucent components 534 and 536 define first and second translucent portions 504 and 506, respectively. Furthermore, the first and second translucent portions 504 and 506 are spaced apart a distance d along the optical axis Z (FIG. 10B). The distance d defines, in part, a portion of the internal chamber (not numbered) in which the sample S can be contained, similar to the embodiment described above. The sidewall 516 is substantially linear along substantially all of the height H of the sample vessel 500. The side wall 516 also defines a substantially square shaped cross-sectional shape that is defined along a plane that is perpendicular to the vertical direction 2. As illustrated, the cross-sectional shape does not substantially vary along the height H.

FIGS. 11A and 11B illustrate another embodiment of a sample vessel 600. Similar reference numbers will be used for features that are common to the sample vessel 100 illustrated in FIGS. 1-6 and the sample vessel 600 illustrated in FIGS. 11A-11B. In accordance with the alternative embodiment illustrated in FIGS. 11A-11B, the sample vessel 600 is includes bottom 612, an open top 614 spaced from the bottom 612 along the vertical direction 2, an opaque component 632 and a separate translucent component 634 coupled to the opaque component 602. The opaque component 632 defines the open top 614, a lower end 652 that is joined to the translucent component 634 at an interface 654 and a sidewall 616 that extends from the top 614 to the lower end 652. The translucent component 634 can be coupled to the opaque component 632 at the interface 654 via ridges/ grooves, a tongue and groove connection, press-fit connection, snap-fit, ultrasonic welding, any other mechanical coupling, or with an adhesive.

Continuing with FIGS. 11A and 11B, an entirety of the translucent component 634 is translucent. The translucent component 634, in turn, defines first and second translucent portions 604 and 606. As shown, the translucent component 634 includes an upper end 662, and a side wall 676 that extends from the upper end 662 to the bottom 612. The translucent component 634 includes a first end 678 and a second end 680 opposite the first end 678 along the axis Z. The first end 678 and the second end 680 define the first translucent portion 604 and the second translucent portions 606, respectively. The first and second translucent portions 604 and 606 are spaced apart a distance d along the optical axis Z. The first translucent portion 604 and the second translucent portions 606 thus define an optical path that extends along axis Z. The distance d defines, in part, a portion of the internal chamber 619 in which the sample S can be contained, similar to the embodiments described above. In the illustrated embodiment, the translucent component 634 extends across an entirety of the bottom 612 of the sample vessel 600. Accordingly, the first and second translucent portions 604 and 606 are disposed along the bottom 612 of the sample vessel 600.

Figure 12A:
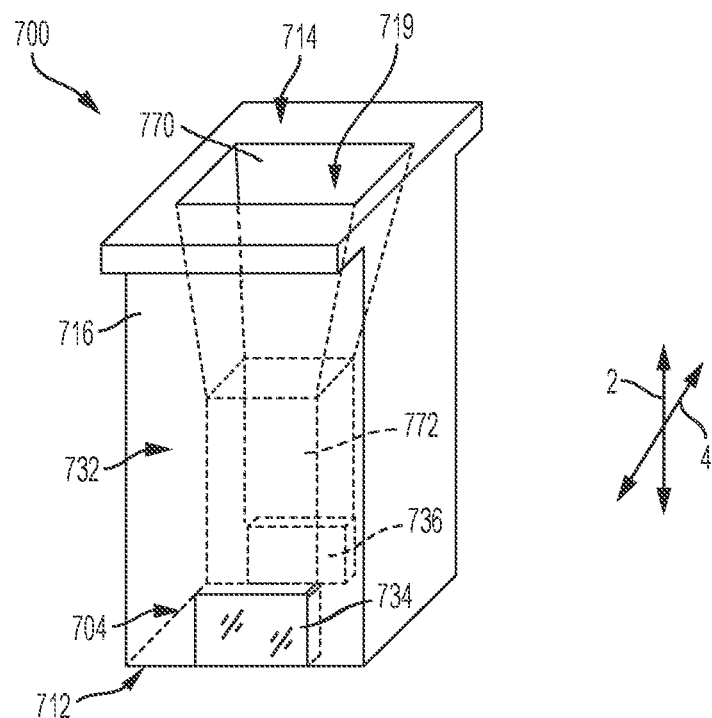
FIG. 12A is a top perspective view of a sample vessel according to another embodiment of the present disclosure.
Figure 12B:
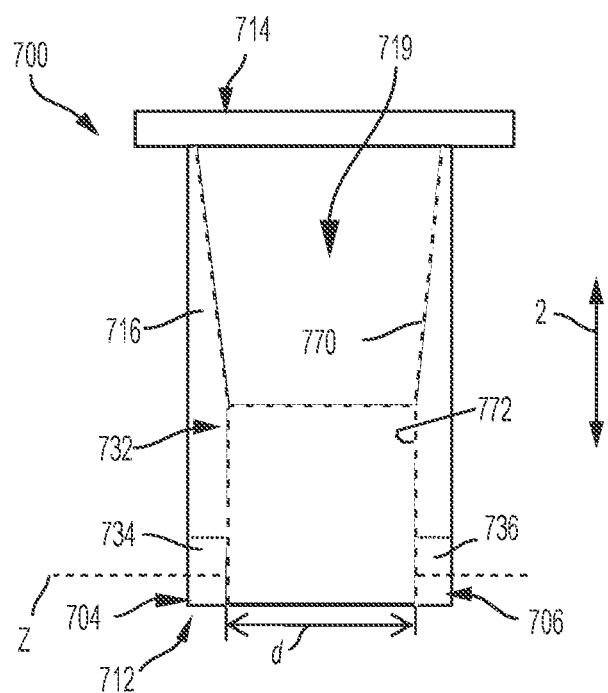
FIG. 12B is a side view of the sample vessel shown in FIG. 112A.

FIGS. 12A and 12B illustrates another embodiment of a sample vessel 700. Similar reference numbers will be used for features that are common to the sample vessel 100 illustrated in FIGS. 1-6 and the sample vessel 700 illustrated in FIGS. 12A and 12B. In accordance with the alternative embodiment illustrated in FIGS. 12A-12B, the sample vessel 700 includes a bottom 712, an open top 714, a sidewall 716, and an internal chamber 719 that extends from the open top 714 toward the bottom 712. The sample vessel 700 includes a tapered inner surface 770 and a non-tapered inner surface 772 (FIG. 12B). The tapered surface 770 and the non-tapered surface 772 define, in part, the internal chamber 719. As shown, the internal chamber 719 includes a tapered portion defined by the tapered inner surface 770 and a non-tapered portion that is defined by the non-tapered inner surface 772. The sample vessel 700 also includes an opaque component 732, a first translucent component 734, and a second translucent component 736. In the illustrated embodiment, the first and second translucent components 734 and 736 define first and second translucent portions 704 and 706, respectively. The first and second translucent portions 704 and 706 are spaced apart a distance d along the optical axis. The distance d defines, in part, a portion of the internal chamber 719 in which the sample S can be contained. The first and second translucent components 734 and 736, and in turn, first and second translucent portions 704 and 706, are disposed along the bottom 712 of the sample vessel 700. As shown, the first and second translucent portions 704 and 706 are aligned with the non-tapered surface 772 the internal chamber 719 along the second axis 3.

Figure 13:
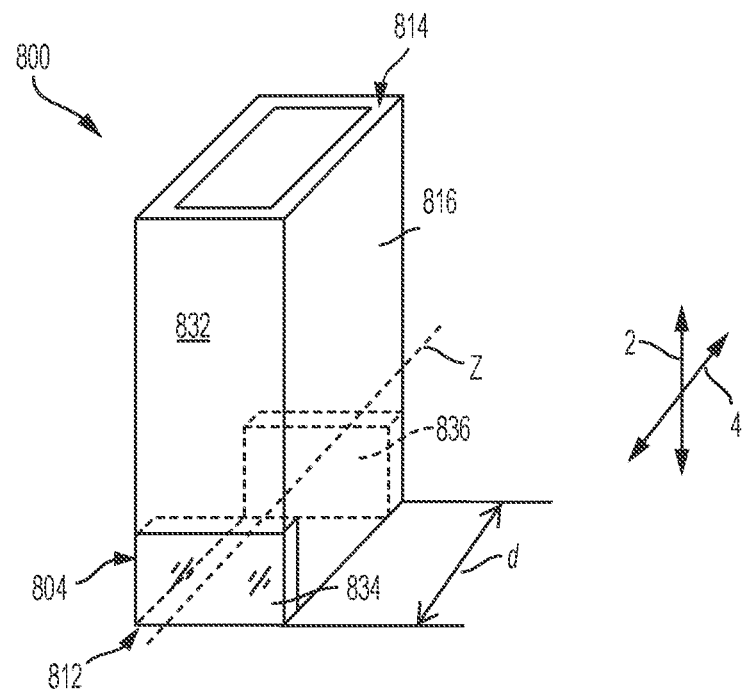
FIG. 13 is a top perspective view of a sample vessel according to another embodiment of the present disclosure.

FIG. 13 illustrates another embodiment of a sample vessel 800. Similar reference numbers will be used for features that are common to the sample vessel 100 illustrated in FIGS. 1-6 and the sample vessel 800 illustrated in FIG. 13. In accordance with the alternative embodiment illustrated in FIG. 13, the sample vessel 800 includes a bottom 812, an open top 814 spaced from the bottom 812 along vertical direction 2, a sidewall 816, and an internal chamber 819 that extends from the open top 814 toward the bottom 812. The sample vessel 800 includes an opaque component 832, a first translucent component 834, and a second translucent component 836. The first translucent component 804 and the second translucent component 806 each have a substantially rectangular cross-sectional shape that is perpendicular to the optical axis Z. Furthermore, the sidewall 816 defines a sample body with a substantially rectangular cross-sectional shape. The cross-sectional shape is defined along a plane that is perpendicular to the vertical direction 2. The cross-sectional shape does not substantially vary along the height H (height H not shown). In the illustrated embodiment, the first and second translucent components 834 and 836 define first and second translucent portions 804 and 806, respectively. The first and second translucent portions 804 and 806 are spaced apart a distance d along the optical axis Z. The distance d defines, in part, a portion (not numbered) of the internal chamber 819 in which the sample S can be contained, similar to the embodiments described above. The first and second translucent components 834 and 836, and in turn, first and second translucent portions 804 and 806, are disposed along the bottom 812 of the sample vessel 800.

Figure 14:
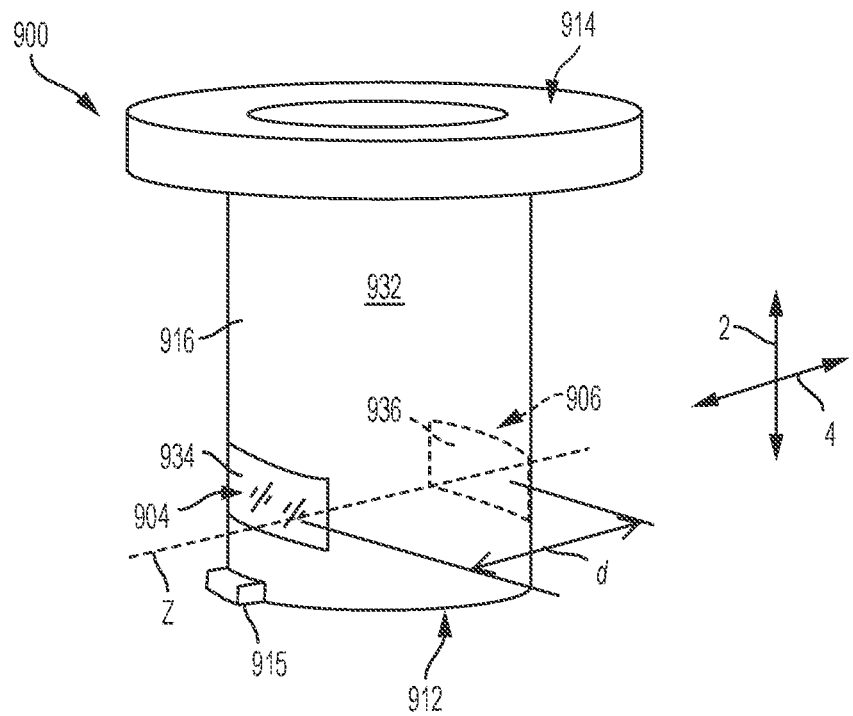
FIG. 14 is a top perspective view of a sample vessel according to another embodiment of the present disclosure.

FIG. 14 illustrates another embodiment of a sample vessel 900. Similar reference numbers will be used for features that are common to the sample vessel 100 illustrated in FIGS. 1-6 and the sample vessel 900 illustrated in FIG. 14. In accordance with the alternative embodiment illustrated in FIG. 14, the sample vessel 900 includes a bottom 912, an open top 914 spaced from the bottom 912 along a vertical direction 2, a sidewall 916, and an internal chamber 919. The sample vessel 900 includes an opaque component 932, a first translucent component 934, and a second translucent component 936. The sample vessel 900 has a curved side wall 916 that defines a substantially circular cross-sectional shape. As shown, the circular cross-sectional shape of the sample vessel 900 is extends along a plane that is perpendicular to the vertical direction 2. In the illustrated embodiment, the first and second translucent components 934 and 936 define first and second translucent portions 904 and 906, respectively. The first and second translucent portions 904 and 906 are spaced apart a distance d along the optical axis. The distance d defines, in part, a portion (not numbered) of the internal chamber 919 in which the sample S can be contained, similar to the embodiments described above. Furthermore, the first and second translucent components 934 and 936, and in turn, first and second translucent portions 904 and 906, are disposed along the bottom 912 of the sample vessel 900. The sample vessel 900 may also include a projection 915 to register the translucent components 934 and 936 with the optical axis Z when the sample vessel 900 is placed in the support 42 (not shown). The projection 915 may slide into a groove or channel (not shown) in the support to align the translucent components 934 and 936 with the optical axis Z. The projection 915 as shown FIG. 14 can function similar to the locking features 142 described above. It should be appreciated that any embodiment described herein may include locking feature 142 as shown in FIGS. 3-6 and/or a projection 915 as shown in FIG. 14.

The invention as described in the present disclosure is capable of exploitation in industry in accordance with how it can be made and/or used.

Those skilled in the art will also appreciate that the present disclosure may be applied to other applications and may be modified without departing from the scope of the present disclosure. Accordingly, the scope of the present disclosure is not intended to be limited to the exemplary embodiments described above, but only by the appended claims.

The following is a number list of non-limiting, illustrative embodiments of the inventive concept disclosed herein:

1. A sample analysis system for analyzing a sample, the sample analysis system comprising:
   an illuminator that emits a light along an optical axis;
   a detector aligned with respect to the illuminator along the optical axis; and
   a sample vessel for placement between the illuminator and the detector, the sample vessel including a body that defines an interior chamber for holding the sample, the body further including an opaque portion, a first translucent portion, and a second translucent portion spaced from the first translucent portion a distance along the optical axis, wherein the first translucent portion and the second translucent portion are aligned with the optical axis when the sample vessel is placed between the illuminator and the detector.

2. The sample analysis system of the illustrative embodiment 1, wherein a) the illuminator emits the light into the sample through the first translucent portion to cause luminescence of the sample, and b) the detector detects the luminescence of the sample that exits through the second translucent portion of the sample vessel.

3. The sample analysis system of the illustrative embodiment 1 or 2, wherein the body includes an opaque body component that defines the opaque portion, a first translucent component that defines the first translucent portion and a second translucent component that defines the second translucent portion.

4. The sample analysis system of any of the illustrative embodiments 1-3, wherein the opaque body component comprises a first polymeric material, and the first and second translucent components each comprises a second polymeric material that is different from the first polymeric material.

5. The sample analysis system of any of the illustrative embodiments 1-3, wherein the body defines a first keyway and a second keyway, and the first and second translucent components are disposed in the first and second keyways, respectively.

6. The sample analysis system of any of the illustrative embodiments 1-5, wherein the body is translucent and the opaque portion is an opaque coating applied to the body.

7. The sample analysis system of any of the illustrative embodiments 1-6, wherein the body defines a first end that includes the first translucent portion, a second end that includes the second translucent portion, and a central horizontal axis that is equidistant between the top and the bottom, wherein an entirety of the first and second translucent portions are positioned entirely below the central horizontal axis.

8. The sample analysis of any of the illustrative embodiments 1-7, wherein the first translucent portion and the second translucent portion are spaced from each other a length, wherein the length is between about 0.10 mm and about 20.0 mm.

9. The sample analysis system of any of the illustrative embodiments 1-8, wherein the body is electrostatically dissipative.

10. The sample analysis system of any of the illustrative embodiments 1-9, wherein the body is an injection molded body.

11. The sample analysis system of any of the illustrative embodiments 1-10, wherein the body defines a first end that includes the first translucent portion, a second end opposite the first end and that includes the second translucent portion, a length that extends from the first end to the second end, a first side, a second side opposite the first side, and a width that extends from the first side to the second side and that is perpendicular to the length, wherein the length is greater than the width.

12. The sample analysis system of any of the illustrative embodiments 1-11, further comprising a support adjacent to the illuminator and the detector and that is aligned with the optical axis.

13. The sample analysis system of any of the illustrative embodiments 1-12, wherein the sample vessel includes a top, a bottom sized to fit in the support and that is opposite to the top, wherein the first and second translucent portions are disposed along the bottom.

14. The sample analysis system of any of the illustrative embodiments 1-13, wherein the support includes a cavity sized to receive the sample vessel, a first aperture that opens to the cavity, and a second aperture opposite the first aperture and that is open to the cavity, wherein the first and second apertures are aligned along the optical axis with the first and second translucent portions, respectively.

15. The sample analysis system of any of the illustrative embodiments 1-14, wherein the sample vessel has a bottom, a top, and a locking feature along the top for engaging the support.

16. The sample analysis system of any of the illustrative embodiments 1-15, wherein the support includes a cartridge for holding a plurality sample vessels.

17. The sample analysis system of the illustrative embodiment 16, wherein each sample vessel has a locking features for engaging the cartridge.

18. A sample vessel for a holding a sample for analysis by a sample analyzer, the sample vessel comprising:
   a body that includes a bottom, an open top spaced from the bottom along a first axis, a side wall that extends from the open top to the bottom, and an interior chamber for holding a sample and that extends from the open top toward the bottom along the first axis, the body including an opaque portion, a first translucent portion, and a second translucent portion spaced from the first translucent portion a distance that extends along a second axis that is perpendicular to the first axis, the first and second translucent portions each disposed along the bottom of the body.

19. The sample vessel of the illustrative embodiment 18, wherein the body includes an opaque body component that defines the opaque portion, a first translucent component that defines the first translucent portion and a second translucent component that defines the second translucent portion.

20. The sample vessel of the illustrative embodiment 18, 19 or 20, wherein the opaque component comprises a first material, and the first and second translucent components each comprise a second polymeric material that is different from the first polymeric material.

21. The sample vessel of any of the illustrative embodiments 18-20, wherein the body defines a first keyway and a second keyway, and the first and second translucent components are disposed in the first and second keyways, respectively.

22. The sample vessel of any of the illustrative embodiments 18-21, wherein the distance is between about 0.10 mm and about 20.0 mm.

23. The sample vessel of any of the illustrative embodiments 18-22, wherein the body is electrostatically dissipative.

24. The sample vessel of any of the illustrative embodiments 18-23, wherein the body is an injection molded body.

25. The sample vessel of any of the illustrative embodiments 18-24, wherein the body is translucent and the opaque portion is an opaque coating applied to the body.

26. The sample vessel of any of the illustrative embodiments 18-25, wherein the body defines a first end that includes the first translucent portion, a second end that includes the second translucent portion, and a central axis that is equidistant between the top and the bottom, wherein an entirety of the first and second translucent portions are positioned entirely below the central axis.

27. The sample vessel of any of the illustrative embodiments 18-26, wherein the body includes an opaque body component that defines the opaque portion, and a translucent body component that defines the first translucent portion and the second translucent portion.

28. The sample vessel of the illustrative embodiment 27, wherein the sidewall is a first sidewall, and the opaque component defines the open top, the first side wall, and a lower end, and the translucent component includes an upper end coupled the lower end of the opaque component, and a second side wall that extends from the upper end of the translucent component to the bottom, wherein the translucent component extends along an entirety of the bottom.

29. The sample vessel of the illustrative embodiment 27 or 28, wherein the second side wall of the translucent component includes a first end and a second end opposite the first end along the first axis, wherein the translucent component extends along an entirety of the bottom such that the first end and the second end define the first translucent portion and the second translucent portion, respectively.

30. The sample vessel of any of the illustrative embodiments 18-29, wherein the body defines a tapered inner surface and a non-tapered inner surface, and the tapered inner surface and the non-tapered surface define, in part, the internal chamber, wherein the first and second translucent portions are aligned with the non-tapered inner surface along the second axis.

31. The sample vessel of any of the illustrative embodiments 18-30, wherein the body defines a first end that includes the first translucent portion, a second end opposite the first end and that includes the second translucent portion, a length that extends from the first end to the second end, a first side, a second side opposite the first side, and a width that extends from the first side to the second side and that is perpendicular to the length, wherein the length is greater than the width.

32. The sample vessel of the illustrative embodiment 31, wherein the sidewall does not substantially taper as it extends from the bottom toward the open top.

33. The sample vessel of any of the illustrative embodiments 18-32, wherein the body has a substantially square cross-sectional shape, wherein the substantially square cross-sectional shape is perpendicular to the first axis.

34. The sample vessel of any of the illustrative embodiments 18-33, wherein the sidewall is curved with respect to the first axis.

35. The sample vessel of the illustrative embodiment 34, wherein the sidewall is curved such that the body has a substantially circular cross-sectional shape, wherein the substantially circular cross-sectional shape is perpendicular to the first axis.

36. The sample vessel of the illustrative embodiment 18, wherein a) the opaque portion, b) the first translucent portion, and c) the second translucent portion are in contact with the sample when the sample is deposited in the internal chamber.

37. The sample vessel of the illustrative embodiment 36, wherein the bottom of the body is defined in part by the opaque portion so that a) the opaque portion, b) the first translucent portion, and c) the second translucent portion are in contact with the sample when the sample is deposited in the internal chamber.

38. A method of making a sample vessel for a sample analyzer, the method comprising:
    injecting an opaque polymeric material into a part cavity of a mold assembly, the part cavity having a shape that corresponds to the sample vessel, wherein the mold assembly includes a first mold, and a second mold engaged with the first mold to define the part cavity, wherein the first mold defines first and second surfaces that are opposite with respect to each other along an axis;
    retracting first and second moveable cores from contact with the first and second surfaces of the first mold along the axis so as to form first and second keyways in the first polymeric material, wherein the first and second keyways are disposed between the first and second cores and the first and second surfaces of the first mold, respectively;
    injecting a translucent polymeric material into the first and second keyways;
    cooling the opaque and translucent polymeric materials in the part cavity to solidify a sample vessel body; and
    removing the sample vessel body from the mold assembly.

39. The method of the illustrative embodiment 38, wherein the first injecting step includes injecting the opaque polymeric material through a first gate disposed between the first and second moveable cores.

40. The method of the illustrative embodiment 38 of 39, wherein the second injecting step includes injecting the translucent polymeric material through second and third gates that are aligned with the first and second keyways.

41. The method of forming a sample vessel according to any one of the illustrative embodiments 18-35.

The invention claimed is:

1. A sample vessel for a holding a sample for analysis by a sample analyzer, the sample vessel comprising:
    a body that includes a bottom, an open top spaced from the bottom along a first axis, a side wall that extends from the open top to the bottom, and an interior chamber for holding a sample and that extends from the open top toward the bottom along the first axis, the body including an opaque portion, a first translucent portion, and a second translucent portion spaced from the first translucent portion a distance that extends along a second axis that is perpendicular to the first axis and forms an optical axis, the first and second translucent portions each disposed along the bottom of the body;
    wherein the body includes an opaque body component that defines the opaque portion, a first translucent component that defines the first translucent portion and a second translucent component that defines the second translucent portion; and
    wherein the opaque body component comprises a first material, and the first and second translucent components each comprise a second polymeric material that is different from the first material.

2. The sample vessel of claim 1, wherein the body defines a first keyway and a second keyway, and the first and second translucent components are disposed in the first and second keyways, respectively.

3. The sample vessel of claim 1, wherein the distance that extends along the second axis is between about 0.10 mm and about 20.0 mm.

4. The sample vessel of claim 1, wherein the body is electrostatically dissipative.

5. The sample vessel of claim 1, wherein the body is an injection molded body.

6. The sample vessel of claim 1, wherein the body defines a first end that includes the first translucent portion, a second end that includes the second translucent portion, and a central axis that is equidistant between the top and the bottom, wherein an entirety of the first and second translucent portions are positioned entirely below the central axis.

7. A sample vessel for a holding a sample for analysis by a sample analyzer, the sample vessel comprising:
    a body that includes a bottom, an open top spaced from the bottom along a first axis, a side wall that extends from the open top to the bottom, and an interior chamber for holding a sample and that extends from the open top toward the bottom along the first axis, the body including an opaque portion, a first translucent portion, and a second translucent portion spaced from the first translucent portion a distance that extends along a second axis that is perpendicular to the first axis and forms an optical axis, the first and second translucent portions each disposed along the bottom of the body;
    wherein the body includes an opaque body component that defines the opaque portion, and a translucent body component that defines the first translucent portion and the second translucent portion.

8. The sample vessel of claim 7, wherein the side wall is a first side wall, and the opaque body component defines the open top, the first side wall, and a lower end, and the translucent body component includes an upper end coupled to the lower end of the opaque body component, and a second side wall that extends from the upper end of the translucent body component to the bottom, wherein the translucent body component extends along an entirety of the bottom.

9. The sample vessel of claim 8, wherein the second side wall of the translucent body component includes a first end and a second end opposite the first end along the first axis, wherein the translucent body component extends along the entirety of the bottom such that the first end and the second end define the first translucent portion and the second translucent portion, respectively.

10. The sample vessel of claim 1, wherein the body defines a tapered inner surface and a non-tapered inner surface, and the tapered inner surface and the non-tapered inner surface define, in part, the internal chamber, wherein the first and second translucent portions are aligned with the non-tapered inner surface along the second axis.

11. The sample vessel of claim 1, wherein the body defines a first end that includes the first translucent portion, a second end opposite the first end and that includes the second translucent portion, a length that extends from the first end to the second end, a first side, a second side opposite the first side, and a width that extends from the first side to the second side and that is perpendicular to the length, wherein the length is greater than the width.

12. The sample vessel of claim 1, wherein the sidewall does not substantially taper as it extends from the bottom toward the open top.

13. The sample vessel of claim 1, wherein the body has a substantially square cross-sectional shape, wherein the substantially square cross-sectional shape is perpendicular to the first axis.

14. The sample vessel of claim 1, wherein the side wall is curved with respect to the first axis.

15. The sample vessel of claim 14, wherein the side wall is curved such that the body has a substantially circular cross-sectional shape, wherein the substantially circular cross-sectional shape is perpendicular to the first axis.

16. The sample vessel any claim 1, wherein the body is translucent and the opaque portion is an opaque coating applied to the body.

17. The sample vessel any claim 1, wherein a) the opaque portion, b) the first translucent portion, and c) the second translucent portion are in contact with the sample when the sample is deposited in the interior chamber.

18. The sample vessel any claim 17, wherein the bottom of the body is defined in part by the opaque portion so that a) the opaque portion, b) the first translucent portion, and c) the second translucent portion are in contact with the sample when the sample is deposited in the interior chamber.

19. A method of making a sample vessel for a sample analyzer, the method comprising:
    injecting an opaque polymeric material into a part cavity of a mold assembly, the
    part cavity having a shape that corresponds to the sample vessel, wherein the mold assembly includes a first mold, and a second mold engaged with the first mold to define the part cavity, wherein the first mold defines first and second surfaces that are opposite with respect to each other along an axis;
    retracting first and second moveable cores from contact with the first and second surfaces of the first mold along the axis so as to form first and second keyways in the opaque polymeric material, wherein the first and second keyways are disposed between the first and second moveable cores and the first and second surfaces of the first mold, respectively;
    injecting a translucent polymeric material into the first and second keyways;
    cooling the opaque and translucent polymeric materials in the part cavity to solidify a sample vessel body; and
    removing the sample vessel body from the mold assembly;
    wherein the opaque polymeric material comprises a first material, and the translucent polymeric material comprises a second polymeric material that is different from the first material.

20. The method of claim 19, wherein the first injecting step includes injecting the opaque polymeric material through a first gate disposed between the first and second moveable cores.

21. The method of claim 19, wherein the second injecting step includes injecting the translucent polymeric material through second and third gates that are aligned with the first and second keyways.

* * * * *